(12) United States Patent
Santiquet et al.

(10) Patent No.: US 10,496,761 B2
(45) Date of Patent: Dec. 3, 2019

(54) COMPUTER-IMPLEMENTED METHOD FOR DESIGNING AN ASSEMBLY OF OBJECTS IN A THREE-DIMENSIONAL SCENE OF A SYSTEM OF COMPUTER-AIDED DESIGN

(71) Applicant: Dassault Systemes, Velizy Villacoublay (FR)

(72) Inventors: Laurent Santiquet, Bouc-Bel-Air (FR); Bertrand Faure, Meudon la Foret (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 374 days.

(21) Appl. No.: 14/163,904

(22) Filed: Jan. 24, 2014

(65) Prior Publication Data

US 2014/0222388 A1 Aug. 7, 2014

(30) Foreign Application Priority Data

Feb. 1, 2013 (EP) .................................... 13305124

(51) Int. Cl.
*G06F 17/50* (2006.01)
(52) U.S. Cl.
CPC .......... *G06F 17/50* (2013.01); *G06F 2217/04* (2013.01)
(58) Field of Classification Search
None
See application file for complete search history.

(56) References Cited

U.S. PATENT DOCUMENTS

2011/0065506 A1* 3/2011 Sugden .................. G06T 15/04
463/32
2014/0046637 A1* 2/2014 Grichnik ............. G06F 17/5009
703/6

FOREIGN PATENT DOCUMENTS

| CN | 102779175 | 11/2012 |
| JP | 08-016826 | 1/1996 |
| JP | 2006-134251 A | 5/2006 |
| JP | 2007-207046 A | 8/2007 |
| JP | 2009-110100 A | 5/2009 |
| WO | 02/073312 A1 | 9/2002 |
| WO | 2004/109561 A1 | 12/2004 |

OTHER PUBLICATIONS

Lee, Sang Hun. "A CAD-CAE integration approach using feature-based multi-resolution and multi-abstraction modelling techniques." Computer-Aided Design 37.9 (2005): 941-955.*
Dutton, G., "Improving Locational Specificity of Map Data—A Multi-Resolution, Metadata-Driven Approach and Notation," *Int. J. Geographical Information Systems*, 10(3):253-268 (Jan. 1, 1996).

(Continued)

*Primary Examiner* — Bijan Mapar
(74) *Attorney, Agent, or Firm* — Hamilton, Brook, Smith & Reynolds, P.C.

(57) ABSTRACT

A computer-implemented method for designing an assembly of objects in a three-dimensional scene of a system of computer-aided design, comprising the steps of: providing (SI), in the scene, a first locator (LOCI) associated with a first design dimensions range; and providing (S2), in the scene, at least one second locator (LOC2a, LOC2b) respectively associated with a second design dimensions range, the first design dimensions range having an upper bound greater than the upper bound of the second design dimensions range.

14 Claims, 9 Drawing Sheets

(56) References Cited

OTHER PUBLICATIONS

Gröger, G., et al., "CityGML—Interoperable Semantic 3D City Models," *ISPRS Journal of Photogrammetry and Remote Sensing*, 71:12-33 (2012).
Stahl, C., et al., "Taking Location Modelling to New Levels: A Map Modelling Toolkit for Intelligent Environments," *Location- and Context-Awareness Lecture Notes in Computer Science*, pp. 74-85 (Jan. 1, 2006).
European Search Report, European Patent Application No. EP 13305124, Title: A Computer-Implemented Method for Designing an Assembly of Objects in a Three-Dimensional Scene of a System of Computer—Aided Design, Date of Search: Jun. 11, 2013. (10 pages).

\* cited by examiner

COMPUTER-IMPLEMENTED METHOD FOR DESIGNING AN ASSEMBLY OF OBJECTS IN A THREE-DIMENSIONAL SCENE OF A SYSTEM OF COMPUTER-AIDED DESIGN

RELATED APPLICATION(S)

This application claims priority under 35 U.S.C. § 119 or 365 to European Application No. 13305124.3, filed Feb. 1, 2013. The entire teachings of the above application(s) are incorporated herein by reference.

FIELD OF THE INVENTION

The invention relates to the field of computers programs and systems, and more specifically to the field of computer-implemented method for designing an assembly of objects in a three-dimensional scene of a system of computer-aided design.

BACKGROUND OF THE INVENTION

This invention is related to general assembly design in which parts or objects of different design dimensions ranges are involved. This invention can be found in any program that mixes through a product structure objects of high dimension (like a 1000 km road) and objects of small dimensions (like a bolt).

Such a design dimensions range corresponds to real dimensions of objects which are comprised between a lower limit and an upper limit delimiting said dimensions range.

It is likely to be found in civil engineering software wherein the mix of objects of different dimensions is very common.

Most of three-dimensional Computer-Aided Design software are already able to handle objects of different design dimensions ranges.

When objects of different design dimensions ranges are all involved in the same scene, the software degrades the precision of modeling to be able to handle this wide range of dimensions.

Standard three-dimensional Computer-Aided Design software face this issue: CATIA, Solidworks, Unigraphics NX, PTC ProEngineer, etc.

However, CATIA Version 5 provides different design dimensions ranges of design in different objects but it is impossible to mix the objects of different design dimensions ranges to make a complete multi design dimensions ranges assembly. This drawback may lead the users to bypass it or use it in a unconventional manner.

For instance, users generally use a scale factor in order to fit large dimension objects into a normal dimension object. For instance, using a 1:1000 scale factor, a 100 km dike becomes a 100 m object which can fit in a normal dimension object. Of course, the issue of mixing objects remains.

Different civil engineering software can also be considered: Autodesk Civil 3D, Bentley Microstation, Nemetschek Allplan, Intergraph SmartPlant, etc.

Those civil engineering software have generally made the assumption of high dimensions objects design, and thus do not allow to design very small and precise mechanical assemblies.

The range of design, which is the size ratio between the biggest and the smallest element, is limited by the hardware architecture of the computer.

This is due to the fact that computers have to encode real numbers in order to represent them in a binary form which is the only one understandable by the computer. With the latest computer architectures and program languages, real numbers are encoded on sixty-four bits. This allows storing roughly a number with a total of fifteen significant digits; all the digits after the fifteenth are ignored (rounded according to IEEE standard).

Unfortunately, due to 'cancellation' errors, this precision decreases when operations are performed on those numbers. For the sake of explanation, the following example is given. To simplify, we consider a (very poor) computer which can only handle three digits (instead of fifteen digits), and we ask this computer to perform the following operation $x+y+z$ with:

$x=8.22$; $y=0.00317$; and $z=0.00432$.

This operation has two different results depending on the order it is computed:
$(x+y)+z$ gives:
$x+y=8.22317$ which is rounded at 8.22
then $(x+y)+z=8.22432$ which is rounded at 8.22
$x+(y+z)$ gives:
$y+z=0.00749$ which is not truncated since it keeps three digits
$x+(y+z)=8.22749$ which is rounded at 8.23
It is possible to imagine the loss of precision when millions of operations are performed to solve differential equations for instance.

This loss of precision increases when the magnitude between the considered numbers increases.

That is why geometric modelers have a predefined and constant range of design for geometric objects which defines the size ratio between the biggest and the smallest element.

That makes it very hard to model and manage a complete assembly which mixes objects of completely different dimensions, for instance a 10000 km road on which there is a car, which contains an electronic board which contains chips which contains transistors. Software must degrade the precision of modeling to be able to handle this wide range of dimensions at the same time. That makes it impossible for the user to get the expected accuracy across all ranges of dimensions that are involved in his design. For instance, an accuracy (or precision) of 1 cm is enough when modeling a dike which spans over 100 km, but the 1 μm precision is mandatory when designing a small mechanical assembly that will be included in this dike.

Thus, to design an assembly of objects, with objects in different design dimensions ranges, it is necessary for the user to change of software with data export, which leads to a significant loss of accuracy.

SUMMARY OF THE INVENTION

A goal of the invention is to provide a computer-implemented method and a system to overcome the above mentioned problems.

It is proposed, according to one aspect of the invention, a computer-implemented method for designing an assembly of objects in a three-dimensional scene of a system of computer-aided design, comprising the steps of:
providing, in the scene, a first locator or reference frame associated with a first design dimensions range; and
providing, in the scene, at least one second locator or local reference frame respectively associated with a second design dimensions range, the first design dimensions range having an upper bound greater than the upper bound of the second design dimensions range.

Thus, it is possible to really increase the precision of a computer-implemented method for designing an assembly of objects in a three-dimensional scene, wherein several objects can be designed in different design dimensions ranges.

According to an embodiment, each locator comprises an axis system.

An axis system provides not only information relative to position but additionally information relative to orientation, for example with angle values.

According to an embodiment, a second locator is positioned relative to the first locator.

A relative positioning allows to locate all elements or objects relatively to each other.

According to an embodiment, different second locators are successively nested.

Thus, it is possible for the user to use several different dimensions ranges nested, so he can define the appropriate design range for all objects in his design.

According to an embodiment, the design dimensions ranges are selectable in a predefined list.

Using a predefined list of design dimensions ranges allows to simplify the development of the application implementing the present method, and simplify data compatibility between users and allow user to be constantly aware of the dimension range and the precision.

According to an embodiment, the first design dimensions range is automatically adapted to fit the biggest object of the assembly.

Thus, the user is sure that the biggest object can be perfectly enclosed in the dimension range.

According to an embodiment, the first design dimensions range is as small as possible.

Thus, the user can make his design automatically with the best adapted first design dimensions range and take benefit of the best possible accuracy.

It is also proposed, according to another aspect of the invention, a computer-readable medium having computer-executable instructions to cause the computer system to perform the method for designing an assembly of objects in a three-dimensional scene as described above.

It is also proposed, according to another aspect of the invention, a computer program product, stored on a computer readable medium, for designing an assembly of objects in a three-dimensional scene, comprising code means for causing the system to take the steps as described above.

It is also proposed, according to another aspect of the invention, an apparatus for designing an assembly of objects in a three-dimensional scene of a computer-aided system comprising means for implementing the steps as described above.

The purpose of the present invention is to allow mixed multi-range 3D design with a precision which always fits user expectation.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The invention will be better understood with the study of some embodiments described by way of non-limiting examples and illustrated by the accompanying drawings wherein.

DETAILED DESCRIPTION OF THE INVENTION

A description of example embodiments of the invention follows.

The teachings of all patents, published applications and references cited herein are incorporated by reference in their entirety.

Following figures explain more in details the functioning of the present invention.

This invention is seen under different aspects.

A first aspect is the availability of different ranges of modeling depending on the dimensions of the part or object of the assembly to design. The user may have the choice between, for instance: ···

Extra Large Design dimensions range
biggest element: 10,000 km
smallest element: 10 mm
Large Design dimensions range
biggest element: 100 km
smallest element: 0.1 mm
Normal Design dimensions range
biggest element: 1 km
smallest element: 0.1 mm
Small Design dimensions range
biggest element: 10 m
smallest element: 10 nm
Extra Small Design dimensions range
biggest element: 0.1 m
smallest element: 0.1 nm ···

Figure 1:
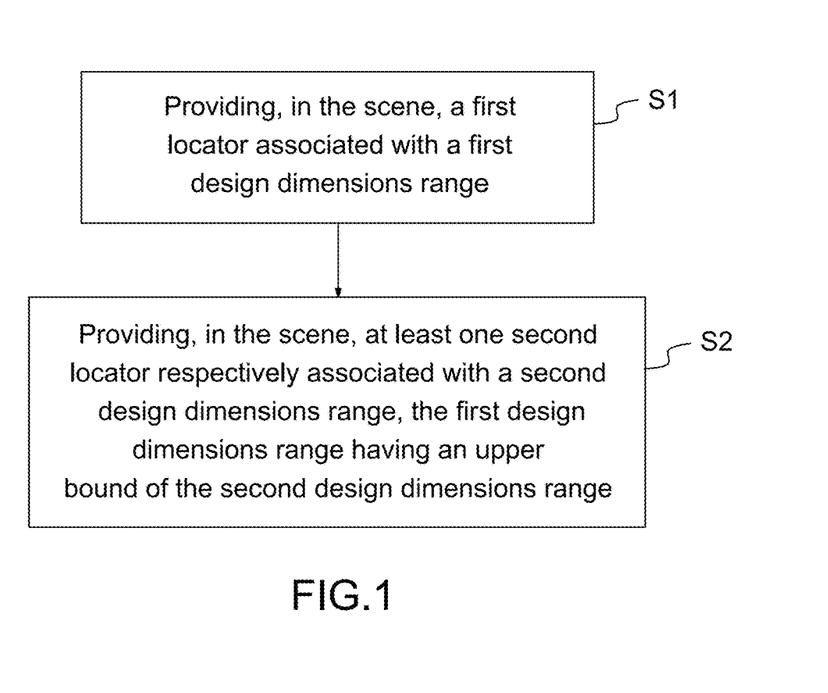
FIGS. 1 to 3 illustrate the method according to aspects of the invention.

Like illustrated on FIG. 1, the computer-implemented method for designing an assembly of objects in a three-dimensional scene of a system of computer-aided design, comprises:

a first step S1 providing, in the scene, a first locator associated with a first design dimensions range; and a second step S2 providing, in the scene, at least one second locator respectively associated with a second design dimensions range, the first design dimensions range having an upper bound greater than the upper bound of the second design dimensions range.

Figure 2:
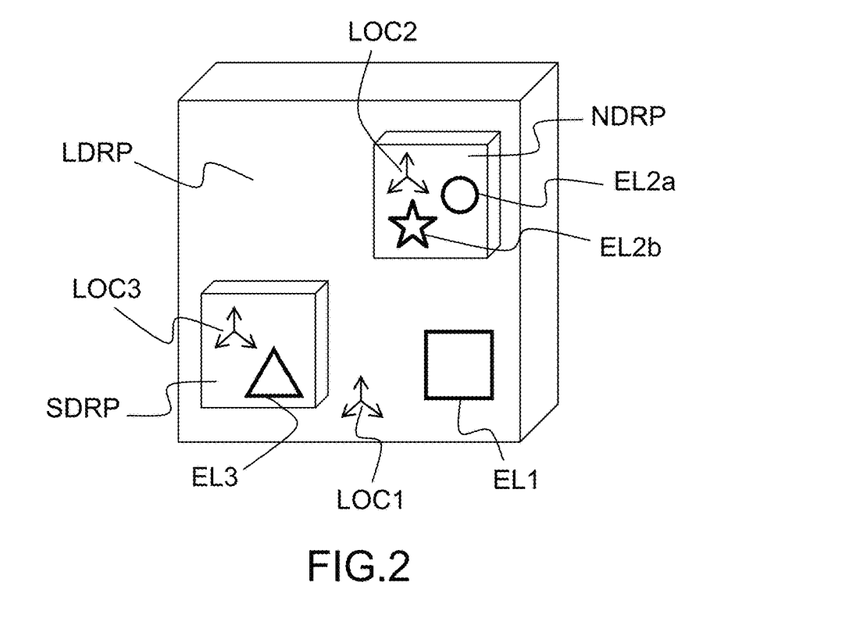

Then, like illustrated on FIG. 2, to realize a mixed design dimensions ranges assembly, the user needs to incorporate a part into an upper design dimensions range assembly.

This is done by defining in the higher design dimensions range assembly a part containing a locator, for example an axis system, that is used to locate and position the lower dimension part. This mechanism can be repeated as many times as desired: the lower dimension part can define a locator in order to locate and position an even lower dimension part, and so on.

An axis system can be used as a locator to locate a part which is not from a directly smaller design dimensions range. That means that the axis system in an Extra Large Design dimensions range part can be used to position a Normal or Small Design dimensions range part (not only a Large Design dimensions range part).

There can be several locators, in the present case several axis systems, if there are several lower dimension parts to be located and assembled with the same part.

The location is associative. If the locator position changes, the part which is positioned on this locator moves accordingly when it gets updated.

In the present case of FIG. 2 is represented a first locator LOC1 associated with an upper design dimensions range assembly which is the Large Design dimensions range Part LDRP, comprising a first element EL1.

In the described examples, locators, or in other words reference and local(s) frames, comprise a respective axis system, but, alternatively, they can comprise any system for spatial positioning.

A second locator LOC2 is associated with a Normal Design dimensions range Part NDRP, comprising two second elements EL2a and EL2b, and a third locator LOC3 is associated with a Small Design dimensions range Part SDRP, comprising a third element EL3.

Figure 3:
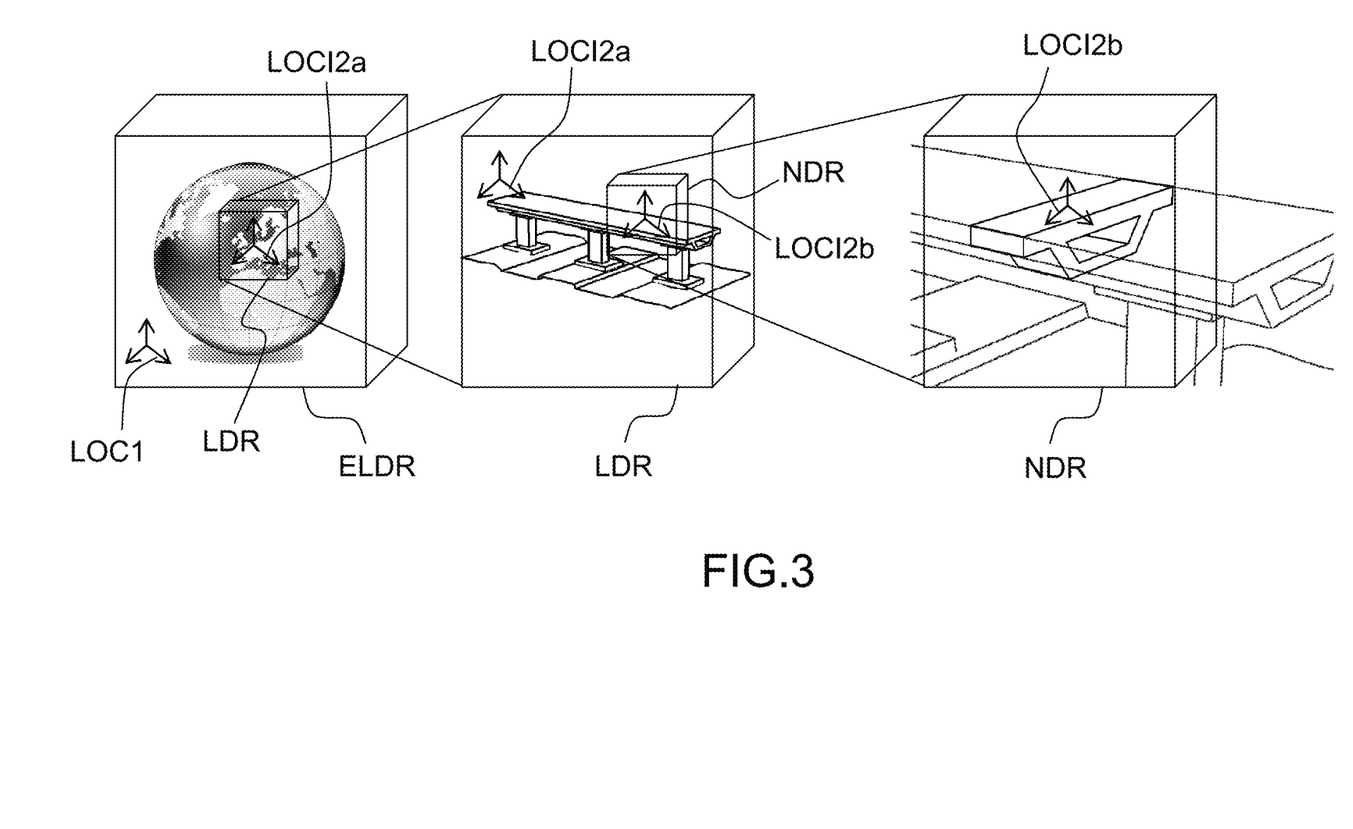

On FIG. 3 is illustrated an example of refinement on the design of a bridge, wherein different second locators are successively nested in a first locator LOC1.

On FIG. 3, the first locator LOC1 is associated with a Extra Large Design dimensions range ELDR, the Earth, and a first second locator LOCI2a associated with a Large Design dimensions range LDR, a bridge, nested in the first locator LOC1, and a second locator LOCI2b associated with a Normal Design dimensions range NDR, a section of the bridge, nested in the first second locator LOCI2a.

This invention also proposes to transfer a part of the geometry in a given design dimensions range part to a lower or upper design dimensions range part.

When the transfer occurs to a lower design dimensions range part, the geometry is clipped to fit into the lower design dimensions range part. The geometry might also need to be cleaned if there are some gaps in the geometry that would have to be filled to get a clean and valid geometry (and topology) after transfer.

FIGS. 4 to 9 illustrate an example of the method according to an aspect of the invention.

Figure 4:
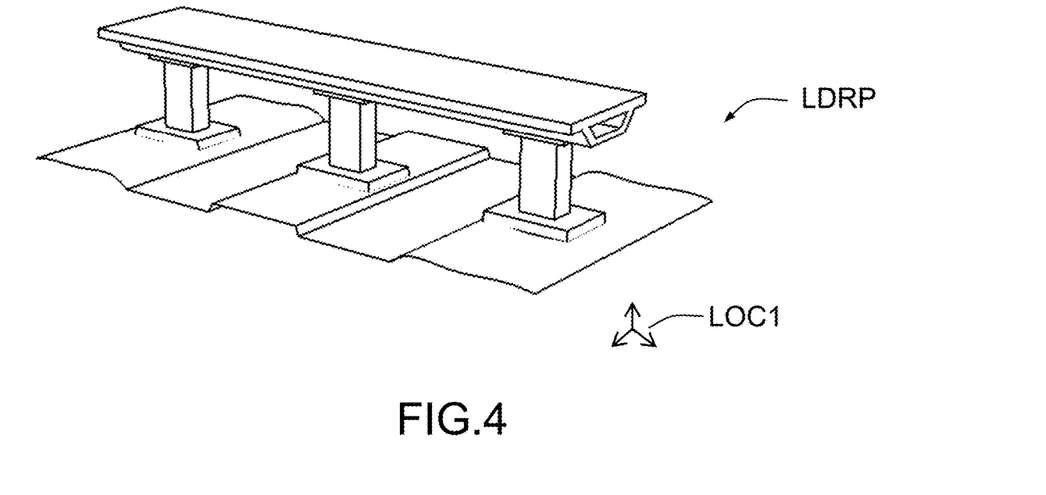
FIGS. 4 to 9 illustrate an example of the method according to an aspect of the invention.

The user can start from a first locator LOC1 associated with a Large Design dimensions range Part LDRP to make the conceptual design of a bridge, like illustrated on FIG. 4.

Figure 5:
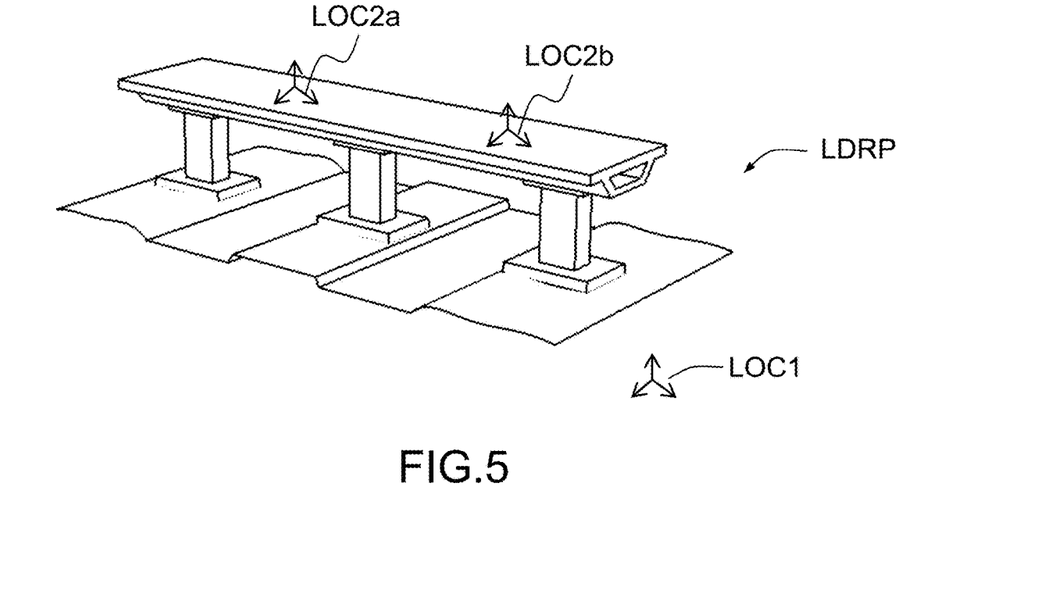
Figure 6:
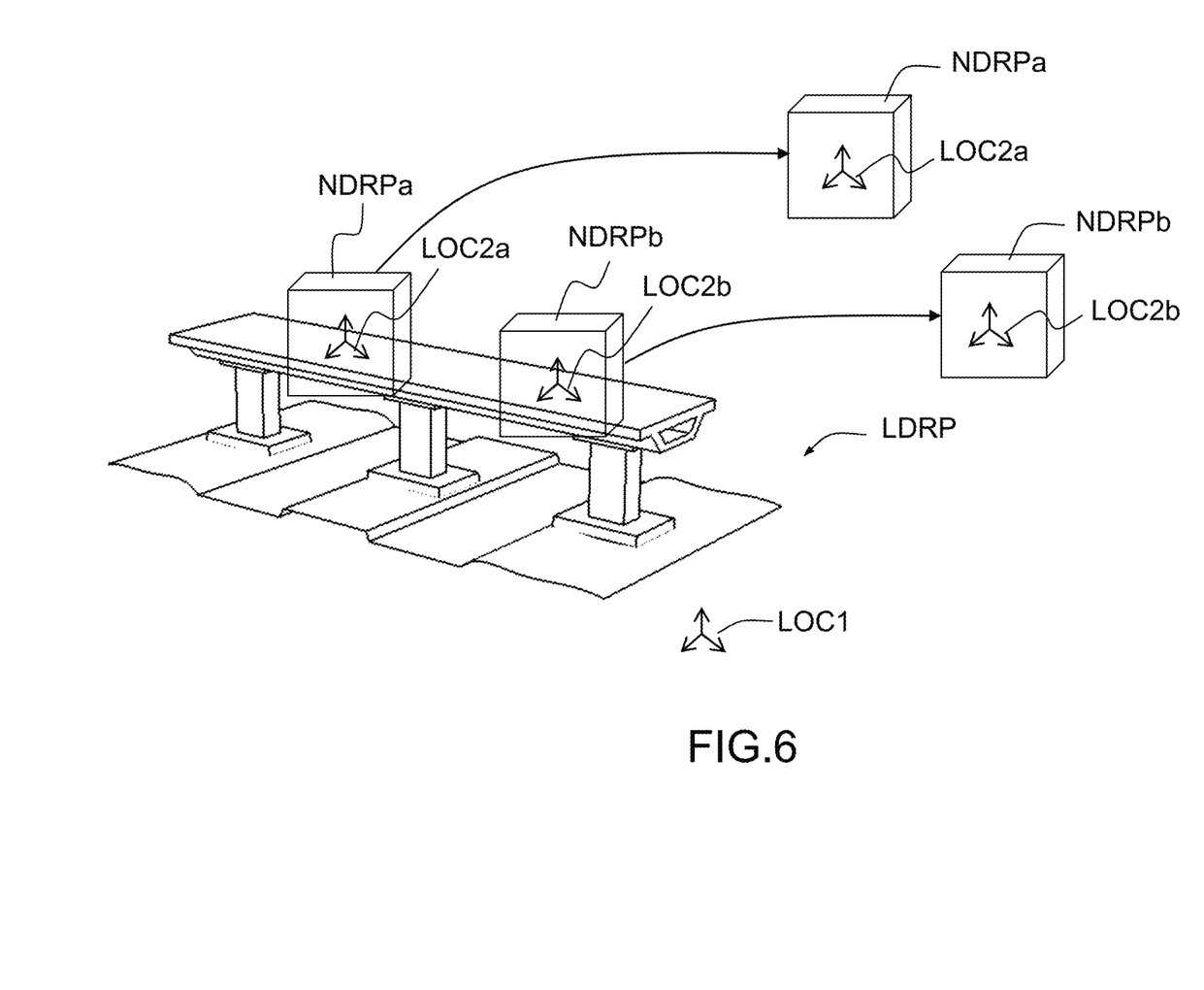

Then, like illustrated on FIG. 5, the user can define two second locators LOC2a and LOC2b, to locate a position two corresponding Normal Design dimensions ranges Parts NDRPa and NDRPb, and on FIG. 6 the user can create and position the two corresponding Normal Design dimensions ranges Parts NDRPa and NDRPb.

The two Normal Design dimensions ranges Parts NDRPa and NDRPb are then empty.

Figure 7:
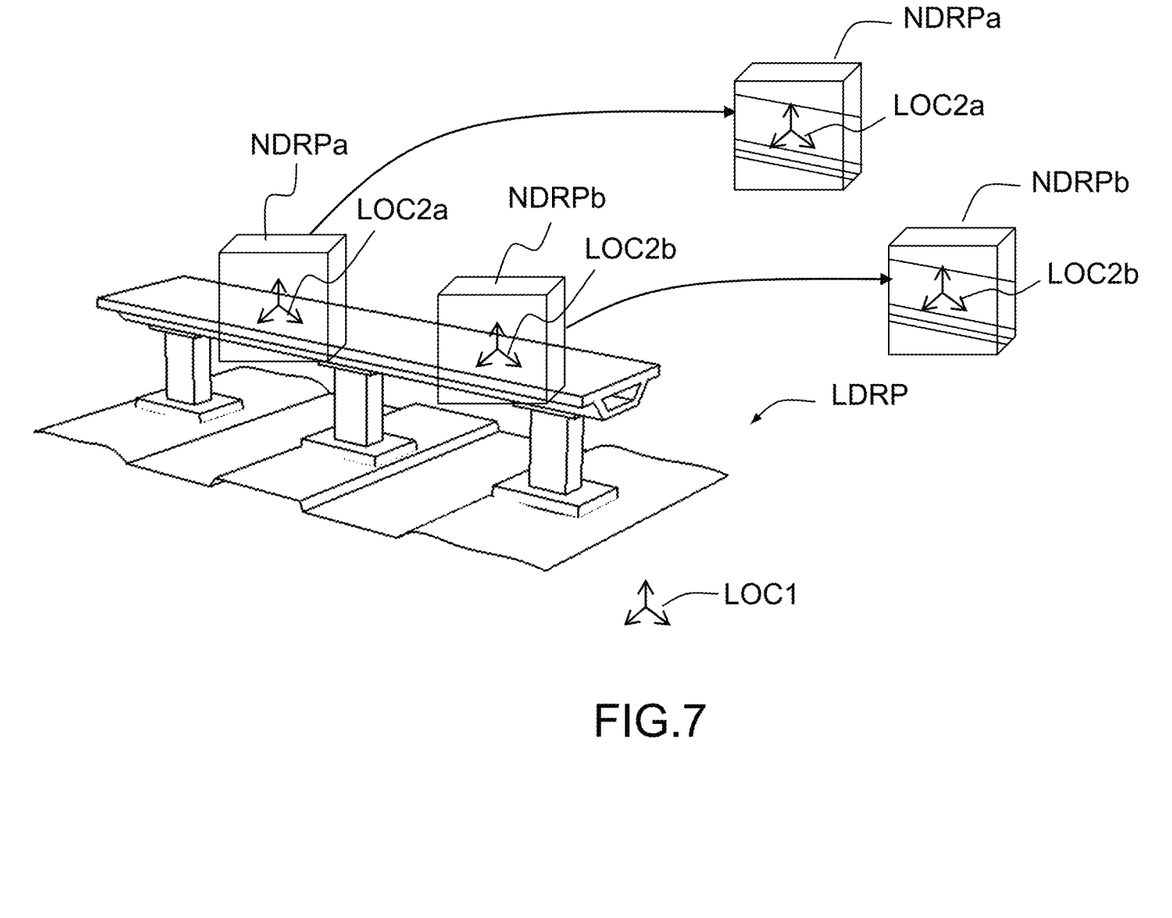

On FIG. 7 is illustrated an Import (or transfer) of skeleton data from the large dimension part. The data are clipped and cleaned if necessary during import. Import mechanism works on any type of geometry (wireframe, surface, solid, mesh . . . ) and is also associative.

Figure 8:
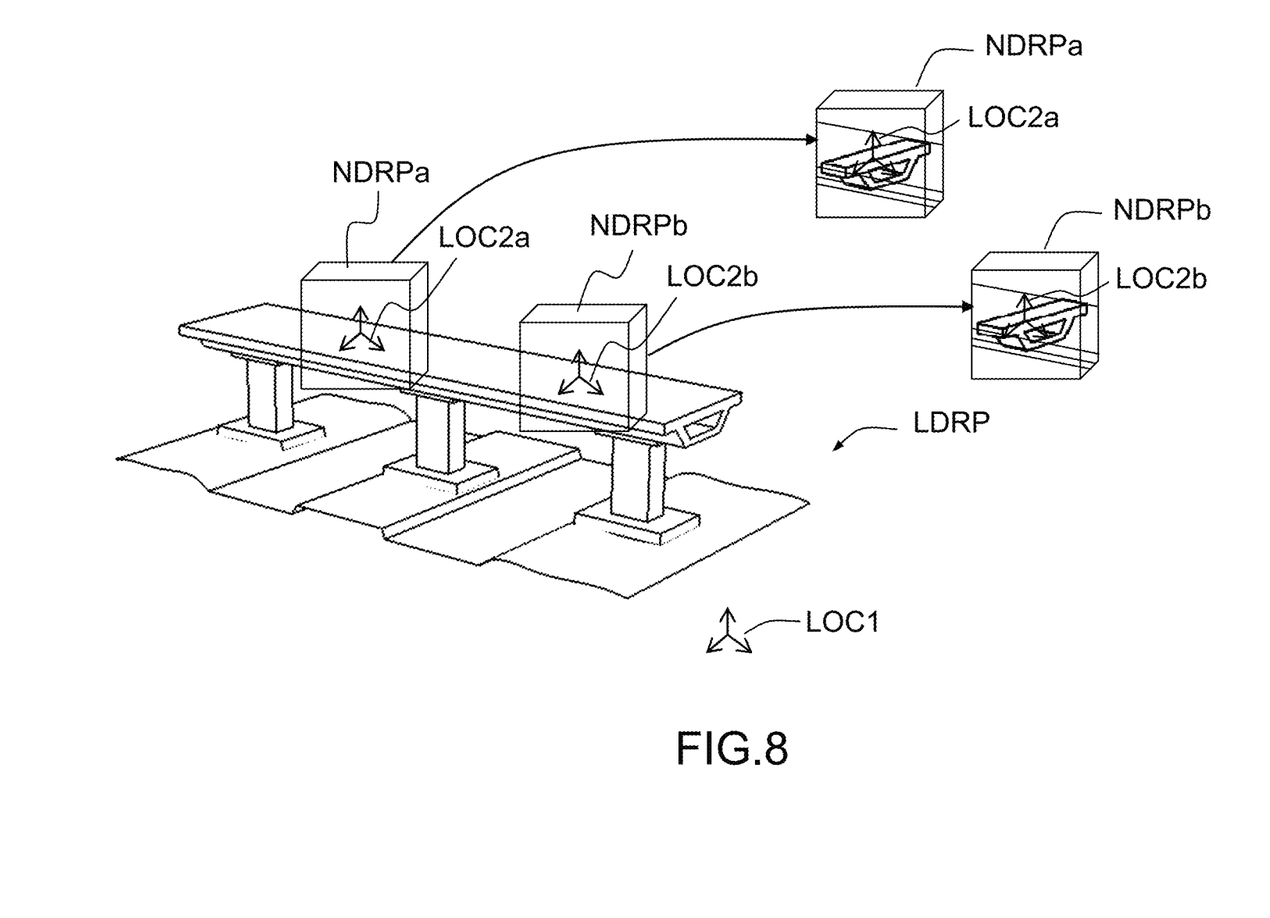

On FIG. 8, the design is finally completed in the two Normal Design dimensions ranges Parts NDRPa and NDRPb.

Figure 9:
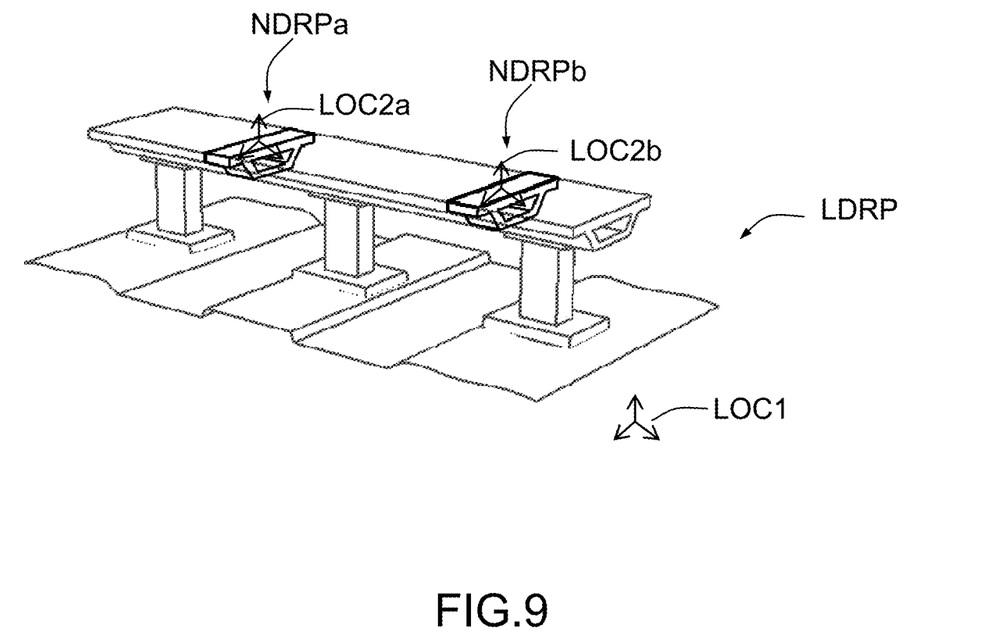

Then, on FIG. 9 is represented an assembly of a large design dimensions range part LDRP and normal design dimensions ranges parts NDRPa and NDRPb.

In this method, everything is intended to be associative, the positioning of the lower dimensions parts on their axis system, and the geometry transfer from one part to another part. That makes this method very easy to automate and the changes very easy to apply.

Conversely, when transferring geometry to an upper dimension part, the geometry is cleaned so that the too small entities (the ones smaller than the precision of the upper dimension part) are removed from the resulting geometry.

For example, the design dimensions ranges are selectable in a predefined list.

Furthermore, the first design dimensions range is adapted to fit the biggest object of the assembly.

The first design dimensions range can be as small as possible.

Figure 10:
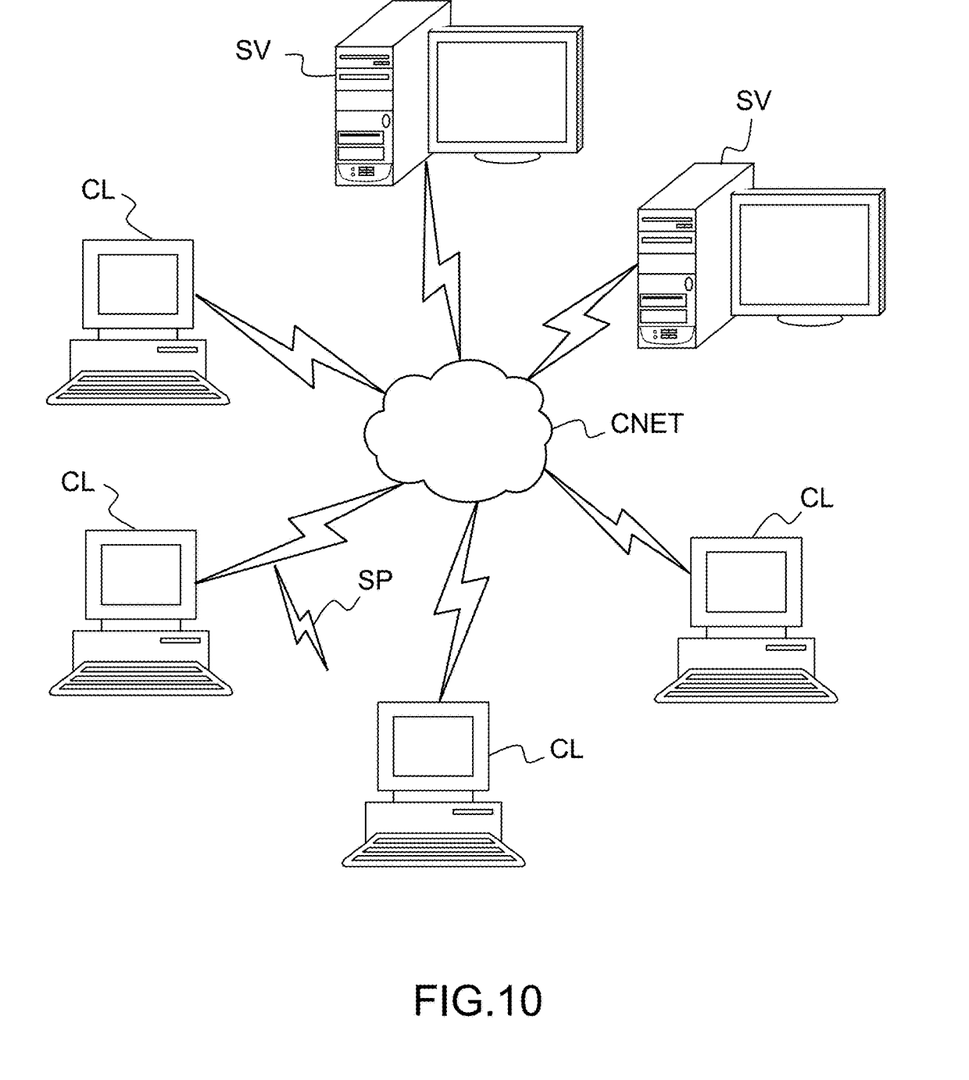
FIG. 10 illustrates a computer network or similar digital processing environment in which the present invention may be implemented.

FIG. 10 illustrates a computer network or similar digital processing environment in which the present invention may be implemented.

Client computer(s)/devices CL and server computer(s) SV provide processing, storage, and input/output devices executing application programs and the like. Client computer(s)/devices CL can also be linked through communications network CNET to other computing devices, including other client devices/processes CL and server computer(s) SV. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 11:
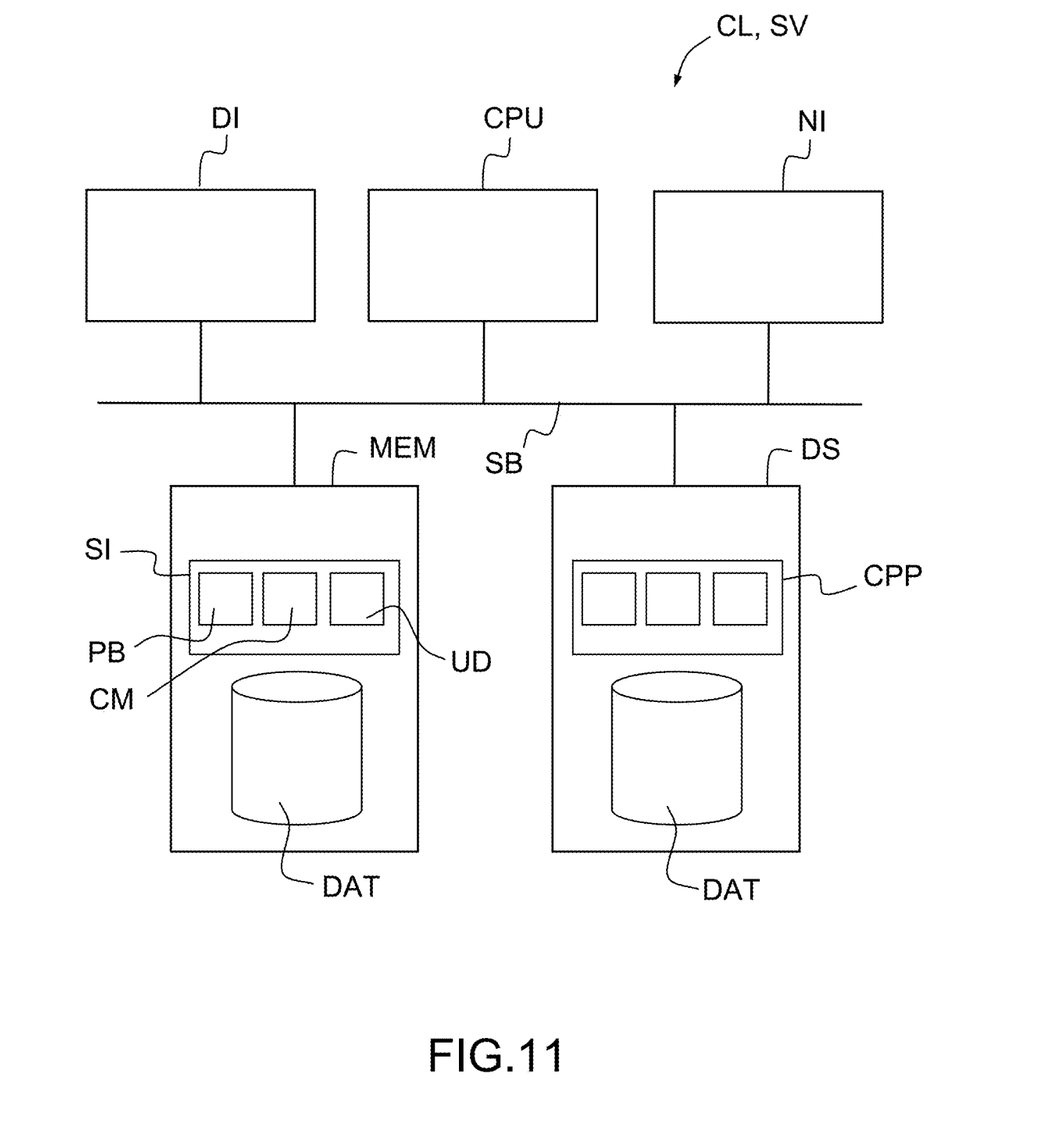
FIG. 11 illustrates a diagram of the internal structure of a computer.

FIG. 11 is a diagram of the internal structure of a computer (e.g., client processor/device CL or server computers SV) in the computer system of FIG. 10. Each computer CL, SV contains system bus SB, where a bus is a set of hardware lines used for data transfer among the components of a computer or processing system. Bus SB is essentially a shared conduit that connects different elements of a computer system (e.g., processor, disk storage, memory, input/output ports, network ports, etc.) that enables the transfer of information between the elements.

Attached to system bus SB is I/O device interface DI for connecting various input and output devices (e.g., keyboard, mouse, displays, printers, speakers, etc.) to the computer CL, SV. Network interface NI allows the computer to connect to various other devices attached to a network (e.g., network CNET of FIG. 10).

Memory MEM provides volatile storage for computer software instructions SI and data CPP used to implement an embodiment of the present invention (e.g., a first path builder PB, means CM for computing a second path, an updater UD implementing the method discussed in FIGS. 1 to 8, and supporting code detailed above).

Disk storage DS provides non-volatile storage for computer software instructions SI and data DAT used to implement an embodiment of the present invention. Central processor unit CPU is also attached to system bus SB and provides for the execution of computer instructions.

In one embodiment, the processor routines SI and data DAT are a computer program product (generally referenced CPP), including a computer readable medium (e.g., a removable storage medium such as one or more DVD-ROM's, CD-ROM's, diskettes, tapes, etc.) that provides at least a portion of the software instructions for the invention system. Computer program product CPP can be installed by any suitable software installation procedure, as is well known in the art.

In another embodiment, at least a portion of the software instructions may also be downloaded over a cable, communication and/or wireless connection. In other embodiments, the invention programs are a computer program propagated signal product SP embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program CPP.

In alternate embodiments, the propagated signal is an analog carrier wave or digital signal carried on the propagated medium. For example, the propagated signal may be a digitized signal propagated over a global network (e.g., the Internet), a telecommunications network, or other network.

In one embodiment, the propagated signal is a signal that is transmitted over the propagation medium over a period of time, such as the instructions for a software application sent in packets over a network over a period of milliseconds, seconds, minutes, or longer.

In another embodiment, the computer readable medium of computer program product CPP is a propagation medium that the computer system CL may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for designing an assembly of objects in a three-dimensional scene of a system of computer-aided design, comprising the steps of:
   (a) providing, in the scene, a first locator associated with a first object of the assembly and with a first design dimensions range, the first object representing a first physical product part and the assembly representing a physical product structure, the first design dimensions range defining upper and lower bounds for dimensions of elements of the first object of the assembly;
   (b) providing, in the scene, simultaneously with the first locator, at least one second locator respectively associated with a second object of the assembly and with a second design dimensions range, the second object representing a second physical product part that is distinct from the first physical product part represented by the first object, the second design dimensions range defining upper and lower bounds for dimensions of elements of the second object of the assembly, the first design dimensions range having an upper bound greater than an upper bound of the second design dimensions range;
   (c) designing the assembly comprising the first and the second objects and the first and the second locators, said designing updating the assembly to locate the represented first and second physical parts within the represented physical product structure, said designing comprising:
      (i) when transferring part of a geometry of the first object to the second object, clipping said geometry of the first object to fit into the second object, and
      (ii) when transferring part of a geometry of the second object to the first object, cleaning said geometry of the second object by removing elements smaller than the lower dimension bound of the first design dimensions range; and
   (d) simultaneously displaying, within the scene, the first and the second objects, together with the first and the second locators, in the respective first and second design dimensions ranges, the displayed designed assembly enabling accurate production of a real-world product comprising the physical product structure represented by the designed assembly.

2. The method of claim 1, wherein each locator comprises an axis system.

3. The method of claim 1, wherein one of the second locators is positioned relative to the first locator.

4. The method of claim 1, wherein different second locators are successively nested.

5. The method of claim 1, wherein the design dimensions ranges are selectable in a predefined list.

6. The method of claim 1, wherein the first design dimensions range is automatically adapted to fit the biggest object of the assembly.

7. A computer system comprising:
   a digital processor; and
   a non-transitory computer-readable medium coupled to the digital processor and having computer-executable instructions to cause the computer system to design an assembly of objects in a three-dimensional scene;
   the computer-executable instructions including instructions configuring the computer system to:
   (a) provide, in the scene, a first locator associated with a first object of the assembly and with a first design dimensions range, the first object representing a first physical product part and the assembly representing a physical product structure, the first design dimensions range defining upper and lower bounds for dimensions of elements of the first object of the assembly;
   (b) provide, in the scene, simultaneously with the first locator, at least one second locator respectively associated with a second object of the assembly and with a second design dimensions range, the second object representing a second physical product part that is distinct from the first physical product part represented by the first object, the second design dimensions range defining upper and lower bounds for dimensions of elements of the second object of the assembly, the first design dimensions range having an upper bound greater than an upper bound of the second design dimensions range;
   (c) design the assembly comprising the first and second objects and the first and second locators, said designing updating the assembly to locate the represented first and second physical parts within the represented physical product structure, said designing comprising:
      (i) when transferring part of a geometry of the first object to the second object, clipping said geometry of the first object to fit into the second object, and
      (ii) when transferring part of a geometry of the second object to the first object, cleaning said geometry of the second object by removing elements smaller than the lower dimension bound of the first design dimensions range; and (d) simultaneously display, within the scene, the first and the second objects of the assembly, together with the first and the second locators, in the respective first and second design dimensions ranges, the displayed designed assembly enabling accurate production of a real-world product comprising the physical product structure represented by the designed assembly.

8. A computer program product comprising:

a non-transitory computer readable medium storing the computer program product for a computer-aided design system;

the computer readable medium configured for designing an assembly of objects in a three-dimensional scene, and comprising code means for causing the computer aided design system to:

(a) provide, in the scene, a first locator associated with a first object of the assembly and with a first design dimensions range, the first object representing a first physical product part and the assembly representing a physical product structure, the first design dimensions range defining upper and lower bounds for dimensions of elements of the first object of the assembly;

(b) provide, in the scene, simultaneously with the first locator, at least one second locator respectively associated with a second object of the assembly and with a second design dimensions range, the second object representing a second physical product part that is distinct from the first physical product part represented by the first object, the second design dimensions range defining upper and lower bounds for dimensions of elements of the second object of the assembly, the first design dimensions range having an upper bound greater than an upper bound of the second design dimensions range;

(c) design the assembly comprising the first and second objects and the first and second locators, said designing updating the assembly to locate the represented first and second physical parts within the represented physical product structure, said designing comprising:

(i) when transferring part of a geometry of the first object to the second object, clipping said geometry of the first object to fit into the second object, and (ii) when transferring part of a geometry of the second object to the first object, cleaning said geometry of the second object by removing elements smaller than the lower dimension bound of the first design dimensions range; and (d) simultaneously display, within the scene, the first and the second objects of the assembly, together with the first and the second locators, in the respective first and second design dimensions ranges, the displayed designed assembly enabling accurate production of a real-world product comprising the physical product structure represented by the designed assembly.

9. An apparatus for designing an assembly of objects in a three-dimensional scene of a computer-aided system comprising:

computer means for implementing the steps of:

(a) providing, in the scene, a first locator associated with a first object of the assembly and with a first design dimensions range, the first object representing a first physical product part and the assembly representing a physical product structure, the first design dimensions range defining upper and lower bounds for dimensions of elements of the first object of the assembly;

(b) providing, in the scene, simultaneously with the first locator, at least one second locator respectively associated with a second object of the assembly and with a second design dimensions range, the second object representing a second physical product part that is distinct from the first physical product part represented by the first object, the second design dimensions range defining upper and lower bounds for dimensions of elements of the second object of the assembly, the first design dimensions range having an upper bound greater than an upper bound of the second design dimensions range;

(c) designing the assembly comprising the first and second objects and the first and the second locators, said designing updating the assembly to locate the represented first and second physical parts within the represented physical product structure, said designing comprising:

(i) when transferring part of a geometry of the first object to the second object, clipping said geometry of the first object to fit into the second object, and (ii) when transferring part of a geometry of the second object to the first object, cleaning said geometry of the second object by removing elements smaller than the lower dimension bound of the first design dimensions range; and (d) simultaneously display, within the scene, the first and the second objects of the assembly, together with the first and the second locators, in the respective first and second design dimensions ranges, the displayed designed assembly enabling accurate production of a real-world product comprising the physical product structure represented by the designed assembly.

10. The apparatus of claim 9, wherein each locator comprises an axis system.

11. The apparatus of claim 9 wherein one of the second locators is positioned relative to the first locator.

12. The apparatus of claim 9 wherein different second locators are successively nested.

13. The apparatus of claim 9 wherein the design dimensions ranges are selectable in a predefined list.

14. The apparatus of claim 9 wherein the first design dimensions range is automatically adapted to fit the biggest object of the assembly.

* * * * *